March 27, 1956  B. L. HICKS  2,739,853
RAILROAD FREIGHT CAR TRUCK BOLSTER SIDE BEARINGS
Filed March 13, 1953  2 Sheets-Sheet 1

INVENTOR.
BENNIE L. HICKS,
BY
McMorrow, Berman + Davidson
ATTORNEYS.

March 27, 1956  B. L. HICKS  2,739,853
RAILROAD FREIGHT CAR TRUCK BOLSTER SIDE BEARINGS
Filed March 13, 1953  2 Sheets-Sheet 2
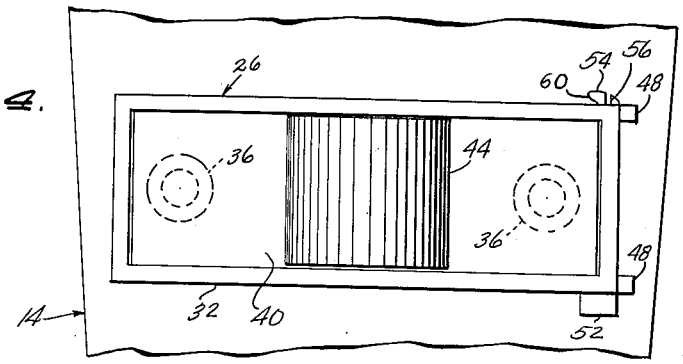
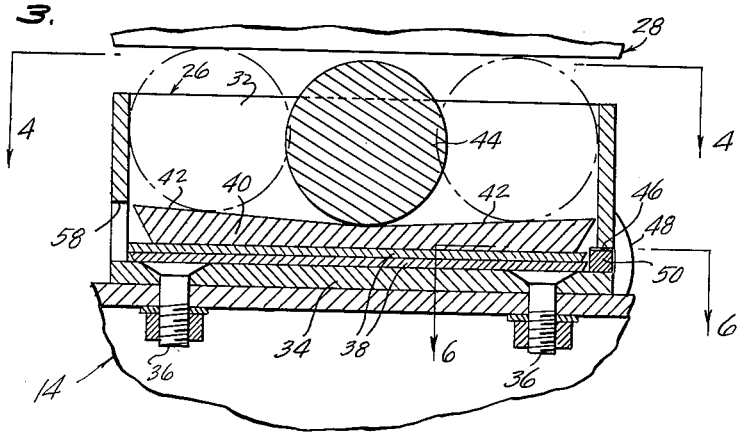
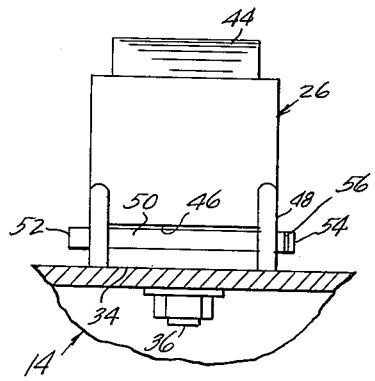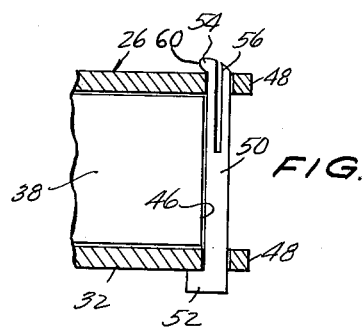
INVENTOR.
BENNIE L. HICKS,
BY
McMorrow, Berman & Davidson
ATTORNEYS.

United States Patent Office 2,739,853
Patented Mar. 27, 1956

2,739,853

RAILROAD FREIGHT CAR TRUCK BOLSTER SIDE BEARINGS

Bennie L. Hicks, Waycross, Ga.

Application March 13, 1953, Serial No. 342,093

1 Claim. (Cl. 308—226)

This invention relates to a railroad freight car truck bolster side bearing.

A bearing of the type stated cooperates with the body bolster side bearings to prevent rocking of the car during turns, and to permit also, free turning of the trucks. There must be a clearance of a fraction of an inch, between these bearings, for this purpose.

After a car has been in service for a period of time, the center plate and center plate bowl of the truck will wear, causing the clearance to be lost. The car then rests directly against the truck bolster side bearing, and as a result, the truck is prevented from turning freely. This will cause a car to be derailed at a curve or switch point.

Ordinarily, when this occurs, the car is taken out of service, jacked up, and the center plate or center plate bowl shimmed, at substantial expense.

The main object of the present invention is to provide a bearing which will eliminate these difficulties, and will permit the desired clearance to be restored without jacking up of the car, taking it out of service, or shimming of the center plate or bowl.

To this end, the invention, summarized briefly, is a side bearing having a box containing a plurality of shims on which a roller bed is supported, a bearing roller being carried upon the bed and the roller being adapted to engage the body bolster side bearing when the car is going around a curve. The box is so formed as to cause the shims to be ordinarily held therein by a retaining key. The key can be removed readily to provide an opening through which the shims can be easily removed or, for that matter, added. An opening at that end of the box remote from the key allows the entry of a suitable tool, for forcing the shims out of the box.

Other objects will appear from the following description, the claim appended thereto, and from the annexed drawings, in which like reference characters designate like parts throughout the several views, and wherein:

Figure 3 is an enlarged longitudinal section through the side bearing in which the truck bolster has been illustrated fragmentarily;

Figure 4 is a top plan view of the side bearing, the truck bolster being illustrated fragmentarily;

Figure 5 is an end elevational view of the side bearing; and

Figure 6 is a fragmentary section on line 6—6 of Figure 3.

Figure 1:
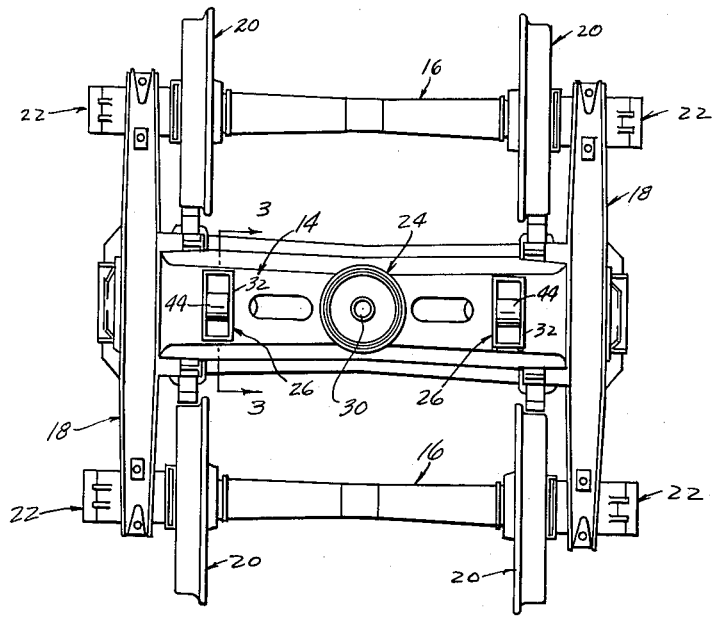
Figure 1 is a top plan view of a truck equipped with side bearing formed in accordance with the present invention.
Figure 2:
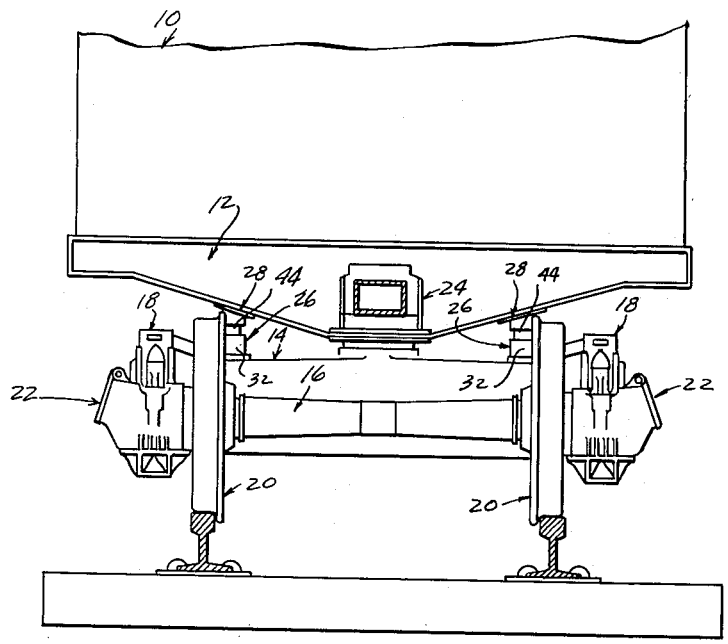
Figure 2 is an end elevational view of said truck, a freight car body and track being illustrated fragmentarily and in section.

Referring to the drawings in detail, the reference numeral 10 designates, generally, a freight car body. The reference numeral 12 has been applied to the car body bolster, while the truck bolster has been designated generally at 14. Axles 16 constitute a part of the truck bolster, said axles being disposed at opposite sides of the bolster as shown in Figure 1. Disposed longitudinally of the freight car body, at opposite sides thereof, are the side portions 18 of the truck, while the wheels carried by the axles have been designated by the reference numeral 20. Journal boxes 22 are also provided, and like the other parts so far described, constitute conventional parts of a freight car truck.

Also conventional is the center pin assembly 24, it being understood that the entire truck is rotatable upon the center pin 30 of said assembly.

The truck bolster side bearings constituting the present invention have been designated generally by the reference numeral 26, and are disposed below the car body bolster side bearings 28. Normally, as shown in Figure 3, there is a small clearance of perhaps one-eighth to three-eighths of an inch between the side bearings 26 of the truck bolster and the body bolster bearings 28. When, however, the car is going around a curve, the bearings 26, 28 engage one another to prevent rocking of the car while still allowing free turning of the truck upon the underside of the car body.

Referring now to the construction which I have devised for a truck bolster side bearing, said bearing includes a rectangular, relatively elongated box 32 formed open at its top, the box 32 having a vertical side wall extending throughout the periphery thereof and a flat, horizontal bottom plate 34. The plate 34 is fixedly connected to the truck bolster 14, at opposite sides of and in spaced relation to the center pin assembly 24, by anchoring screws or bolts 36, said bolts 36 having their heads engaged in correspondingly countersunk bolt-receiving openings formed in the bottom plate 34 of the box 32.

Covering the full area of the bottom plate 34 are removable shims 38, said shims 38 being formed as flat, rectangular pieces of material of suitable thickness. Any number of shims can be deposited in the bottom of the box, and supported upon the shims is a roller bed 40. The roller bed 40, when considered in top plan, also covers the full bottom area of the box 32, and as will be noted from Figure 3, the top surface of the roller bed 40 is inclined downwardly as at 42 from the opposite ends of the roller bed to the midlength location of said bed.

Extending transversely of the box 32, and supported upon the depressed midlength portion of the roller bed, is a roller 44, said roller being so proportioned as to diameter as to project a short distance above the top edge of the side wall of the box (see Figure 3).

The roller 44 is normally spaced a small distance from the adjacent bottom surface of the car body bolster bearing 28, as shown in Figure 3. When, however, the car is going around a curve, the roller 44 will be disposed in rollable contact with the bearing 28, thus to permit free turning of the truck while preventing lateral sway of the car body 10.

In one end of the box 32 there is provided a transversely extended key slot 46, said key slot being disposed at the lower end of one of the end walls of the box. The key slot 46 opens upon the opposite sides of the box 32, to permit entry of the shim-retaining key. The key is entered through one of the open ends of the key slot, and as will be noted from Figures 3 and 4, ears 48 extend upwardly along the end wall of the box in which the key slot is formed, to require that the key 50 be entered in the direction of its own length. Once the key is entered, the ears 48 will prevent removal of the key, except in the direction of its length.

At one end, the key 50 has a lateral extension 52 which limits movement of the key 50 in one direction within the box, said lateral extension engaging the adjacent side wall of the box.

As will be noted from Figure 6, that end of the key remote from the lateral extension 52 is formed with a beveled end surface merging into a laterally projected lug 54 that will engage the side wall opposite that engaged by the lateral extension 52. The beveled end of the key 50 is also formed with a longitudinal slot 56, said slot opening upon the beveled surface.

This construction permits the slotted end portion of the key 50 to be compressed widthwise when the key is being entered or removed. In other words, the key can be forced through the ends of the slot 46, and when shifted fully to the position thereof shown in Figure 6, will be held against removal by the lug 54 and lateral extension 52 respectively.

At that end of the box 32 remote from the end in which the key 50 is mounted, I provide an opening 58, the opening 58 being adapted to receive a suitable tool, not shown, whereby said tool can be used to force the shims 38 out of the box 32, when the key is removed.

In use of the bearing, a selected number of shims 38 is provided in the bottom of the box 32. Thereafter, when the center plate or center plate bowl wears, and the car body is supported directly upon the side bearing 26, rather than spaced a short distance above said side bearing, the key 50 can be easily removed, without the necessity of jacking up the car body. When the key 50 is removed, the slot 46 will be fully opened. The car inspector or repair man can then position a chisel or similar tool through the opening 58, and can hammer thereupon, so as to force one or more of the shims 38 out of the slot 46. This will lower the roller 44, so as to provide, once again, the desired clearance between the car body bolster side bearings and the truck bolster side bearings.

After the desired adjustment has been made, the key 50 is returned to its normal position, and will be adapted to retain the remaining shims 38 in place.

With further reference to the particular formation and operational characteristics of the key, the beveled end hereinbefore referred to has a slight curvature thereto (see Figures 4 and 6), the curved end surface of the key merging into that longitudinal or side surface of the key shown at the right in Figure 6, that is, the side surface opposite that from which lug 54 projects laterally. The provision of the beveled, essentially curvilinear end surface on the key eliminates a sharp corner where said end surface merges into the side surface. Further, the curved, beveled end surface merges, after crossing the slot, into the correspondingly curved surface of lug 54, the lug being rounded along its entire outer surface to form thereon a cam surface 60 disposed substantially in a plane oblique to the length of the key. Due to this arrangement, in removing the key the worker may strike the beveled end surface of the key with a hammer, and on account of the provision of cam surface 60, the portion of the key carrying lug 54, that is, the portion disposed at the left of the slot in Figure 6, will be cammed to the right in Figure 6, for the purpose of effecting the previously mentioned widthwise compression of the key. The key at the same time is forced by the hammer blow downwardly in Figure 6, out of slot 46. Subsequently, when the key is being reinserted, it may initially be positioned obliquely to the length of the slot 46, without being compressed widthwise at its slotted end, to enter lug 54 in the aperture of the ear 48 disposed adjacent the extension 52 in Figure 6. This is permitted due to the beveling of the end surface and the curvilinear conformation of said beveled end surface. The key is then, with lug 54 seated in the aperture, swung into longitudinal alignment with slot 46, in effect pivoting upon lug 54, thus compressing the key at its slotted end, to permit it to be inserted in the direction of its length into the slot.

It will be readily apparent that a truck bolster side bearing formed as illustrated and described is so designed as to permit adjustments to be made without the necessity of taking a car out of service. This, obviously, will save considerable time and expense for the car owner. All adjustments, of course, can be made by a single workman, who can be relatively unskilled and who does not need special tools.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A railroad car truck bolster side bearing comprising: a bearing box adapted to be mounted upon a truck bolster and having a flat bottom, upstanding side and end walls, an open top, and a transverse slot formed in one of the end walls and extending horizontally between the side walls, said bottom of the bearing box extending fully to the slotted end wall and forming the lower edge of said slot, the slot opening at its ends through the respective side walls; at least one flat shim supported in the box upon the bottom thereof and proportioned to cover substantially the full area of said bottom, said slot providing access to the shim; a roller bed supported on the shim and covering substantially the full area thereof; a roller arranged transversely of the bearing box and supported upon the roller bed, said roller projecting above the open top of the box; and a key removably inserted in and filling said slot, said key being formed as a relatively elongated member the ends of which project through the ends of the slot outwardly from the respective side walls from the box, one end of the key being formed with a lateral extension engaging against the side wall adjacent thereto to prevent longitudinal movement of the key in one direction, and the other end of the key having a laterally projecting lug engaging against the other side wall, said key being formed at said other end thereof with an elongated, longitudinal slot permitting the key to be compressed widthwise, for movement of the lug into the slot and removal of the key from the first-named slot in the direction of the length of the key, said other end of the key being beveled so as to dispose the end surface of the key at said other end thereof substantially in a plane oblique to the length of the key, said end surface being curved and the lug being formed with a rounded outer surface merging into the curved end surface at one side of the key, said curved end surface merging in an essentially curvilinear path into the opposite side surface of the key, the rounded outer surface of the lug including a cam surface oblique to the length of the key for compressing the key widthwise by engagement of the cam surface against the adjacent side wall of the box responsive to a force exerted against said end surface of the key tending to shift the key longitudinally in a direction opposite that in which longitudinal movement of the key is prevented by said lateral extension.

References Cited in the file of this patent

UNITED STATES PATENTS

| 425,468 | Teamer | Apr. 15, 1890 |
| 1,246,589 | Gregg | Nov. 13, 1917 |
| 2,142,428 | Webb | Jan. 3, 1939 |
| 2,156,705 | Severn | May 2, 1939 |